United States Patent
Benisty et al.

(10) Patent No.: US 11,494,097 B2
(45) Date of Patent: Nov. 8, 2022

(54) FAST INITIALIZATION OF SECURE HMB

(71) Applicant: Western Digital Technologies, Inc., San Jose, CA (US)

(72) Inventors: Shay Benisty, Beer Sheva (IL); Ishai Ilani, Dolev (IL)

(73) Assignee: Western Digital Technologies, Inc., San Jose, CA (US)

( * ) Notice: Subject to any disclaimer, the term of this patent is extended or adjusted under 35 U.S.C. 154(b) by 59 days.

(21) Appl. No.: 17/210,174

(22) Filed: Mar. 23, 2021

(65) Prior Publication Data

US 2022/0179571 A1    Jun. 9, 2022

Related U.S. Application Data

(60) Provisional application No. 63/122,254, filed on Dec. 7, 2020.

(51) Int. Cl.
  *G06F 12/00* (2006.01)
  *G06F 3/06* (2006.01)
  *H04L 9/32* (2006.01)

(52) U.S. Cl.
  CPC .......... *G06F 3/0632* (2013.01); *G06F 3/0623* (2013.01); *G06F 3/0673* (2013.01); *H04L 9/3236* (2013.01); *H04L 9/3247* (2013.01)

(58) Field of Classification Search
  CPC .... G06F 3/0632; G06F 3/0623; G06F 3/0673; H04L 9/3236; H04L 9/3247
  See application file for complete search history.

(56) References Cited

U.S. PATENT DOCUMENTS

| | | | | |
|---|---|---|---|---|
| 6,173,280 B1* | 1/2001 | Ramkumar | ......... | G06F 16/2465 707/999.102 |
| 9,418,131 B1 | 8/2016 | Halevi et al. | | |
| 10,997,080 B1* | 5/2021 | Eliash | ................. | G06F 12/0871 |
| 2002/0184504 A1* | 12/2002 | Hughes | ................. | H04L 9/3247 713/176 |
| 2007/0034687 A1* | 2/2007 | Numao | ................. | H04L 9/3247 235/380 |
| 2009/0006853 A1* | 1/2009 | Li | ....................... | H04L 63/0428 713/176 |
| 2010/0332732 A1* | 12/2010 | Chiang | ............... | G06F 12/0246 711/E12.001 |

(Continued)

*Primary Examiner* — Shawn X Gu
*Assistant Examiner* — Mohammad S Hasan
(74) *Attorney, Agent, or Firm* — Patterson & Sheridan, LLP; Steven H. VerSteeg

(57) ABSTRACT

The present disclosure generally relates to data storage devices and related methods that use secure host memory buffers (HMBs) and low latency operations. A controller of the data storage device is configured to access the HMB, where the HMB stores a Merkle Tree. When the HMB is initialized, the controller determines a number of hash levels of the Merkle Tree. Each hash level of the Merkle Tree comprises one or more hashes. When storing location data in a target data block of the Merkle Tree, the controller is configured to initialize only the hashes along a path between a top hash and the target data block. Each hash along the path has a non-initialized hash coupled to a common hash. The non-initialized hash is programmed with a non-initialized bit, such that only the relevant hashes and data blocks are initialized.

17 Claims, 6 Drawing Sheets

(56) References Cited

U.S. PATENT DOCUMENTS

| | | | |
|---|---|---|---|
| 2016/0253322 A1* | 9/2016 | Li | G06F 16/137 |
| | | | 707/747 |
| 2016/0365978 A1* | 12/2016 | Ganesan | H04L 9/14 |
| 2018/0074722 A1 | 3/2018 | Iwai | |
| 2020/0012595 A1* | 1/2020 | Bordia | G06F 3/0673 |
| 2020/0133566 A1* | 4/2020 | Kim | H04L 9/3247 |
| 2020/0220735 A1* | 7/2020 | Praus | H04L 9/3013 |
| 2021/0019232 A1* | 1/2021 | Murti | H04L 67/1097 |
| 2021/0019418 A1 | 1/2021 | Peeters et al. | |
| 2021/0109437 A1 | 4/2021 | Oh et al. | |
| 2021/0226772 A1 | 7/2021 | Zalivaka et al. | |
| 2021/0357147 A1* | 11/2021 | Li | G06F 11/1044 |
| 2021/0397600 A1 | 12/2021 | Desai et al. | |

\* cited by examiner

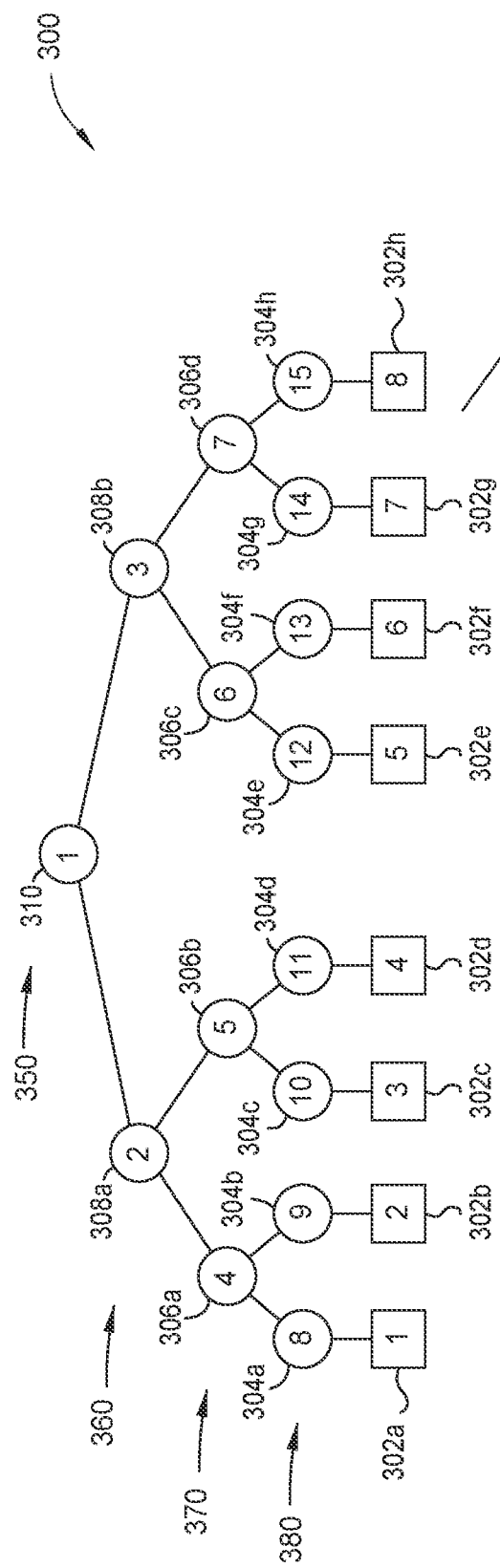
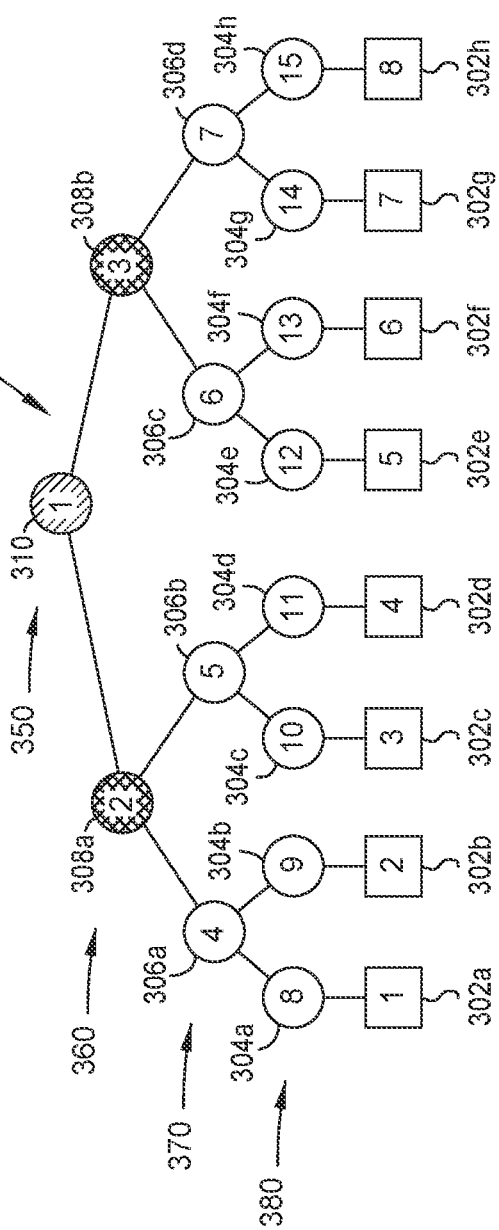
FIG. 3A
FIG. 3B

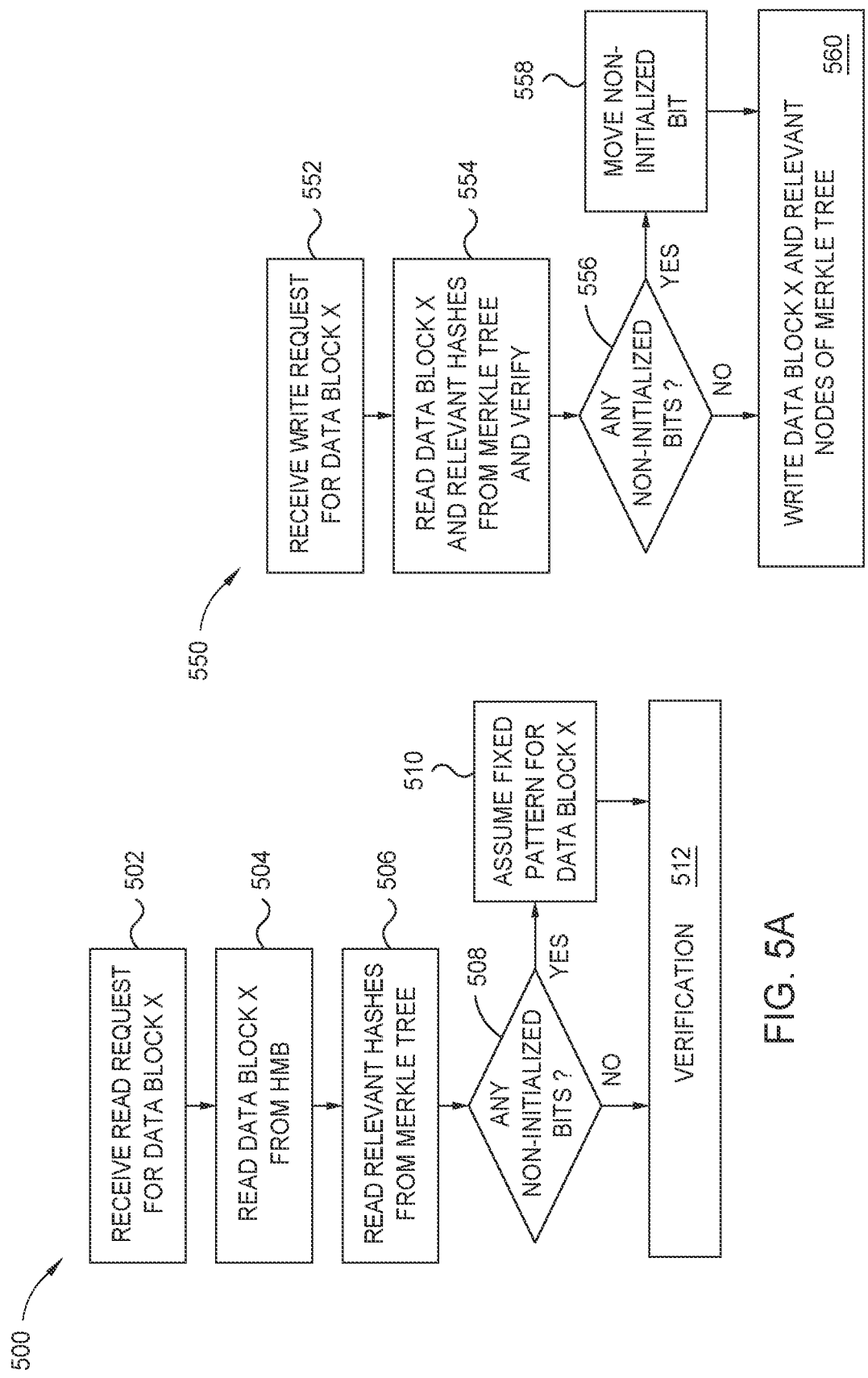

FAST INITIALIZATION OF SECURE HMB

CROSS-REFERENCE TO RELATED APPLICATIONS

This application claims benefit of U.S. provisional patent application Ser. No. 63/122,254, filed Dec. 7, 2020, which is herein incorporated by reference.

BACKGROUND OF THE DISCLOSURE

Field of the Disclosure

Embodiments of the present disclosure generally relate to data storage devices and related methods that use secure host memory buffers and low latency operations.

Description of the Related Art

The host memory buffer (HMB) feature in a data storage device allows a controller of the data storage device to utilize a designated portion of a host memory. The designated memory resources of a host device are allocated to the controller of the data storage device. The controller may be responsible for initializing the host memory resources. By using the HMB, the required size of dynamic random access memory (DRAM) may be reduced and the cost of the data storage device may be reduced.

Because the HMB is an external memory to the data storage device, the data storage device may be subjected to security attacks, such as network attacks including replay attacks and/or playback attacks, by attacking the host DRAM, specifically, the HMB. A replay attack and/or playback attack is a form of network attack in which a valid data transmission is maliciously or fraudulently repeated or delayed. The replay attack and/or playback attack may either be carried out by an originator or by an adversary who intercepts the data and re-transmits it. The replay attack and/or playback attack may be part of a masquerade attack by IP packet substitution. When initializing the HMB, specifically a Merkle Tree of the HMB, each hash and data block of the Merkle Tree is initialized. Because each hash and data block is initialized, the initialization time may result in delayed usage of the HMB.

Thus, there is a need in the art for data storage devices that implements a secure HMB protocol while decreasing HMB initialization latency.

SUMMARY OF THE DISCLOSURE

The present disclosure generally relates to data storage devices and related methods that use secure host memory buffers (HMBs) and low latency operations. A controller of the data storage device is configured to access the HMB, where the HMB stores a Merkle Tree. When the HMB is initialized, the controller determines a number of hash levels of the Merkle Tree. Each hash level of the Merkle Tree comprises one or more hashes. When storing location data in a target data block of the Merkle Tree, the controller is configured to initialize only the hashes along a path between a top hash and the target data block. Each hash along the path has a non-initialized hash coupled to a common hash. The non-initialized hash is programmed with a non-initialized bit, such that only the relevant hashes and data blocks are initialized.

In one embodiment, a data storage device comprises one or more memory devices and a controller coupled to the one or more memory devices. The controller is configured to access a host memory buffer (HMB) of a host device, where the HMB includes a Merkle Tree comprising a plurality of data blocks and a total number of hash levels, where each hash level of the Merkle Tree includes at least one hash of a plurality of hashes, and where each hash of a last hash level is coupled to a data block of the plurality of data blocks, determine a first number of hash levels of the Merkle Tree to initialize, the first number of hash levels being less than the total number of hash levels, initialize the first number of hash levels, and initialize one or more first hashes on a path between a top hash level and a target data block of the plurality of data blocks.

In another embodiment, a data storage device comprises one or more memory devices and a controller coupled to the one or more memory devices. The controller is configured to access a HMB of a host device, where the HMB comprises a Merkle Tree comprising a plurality of data blocks and a number of hash levels, where each hash level of the Merkle Tree comprises at least one hash of a plurality of hashes, and where each hash of a last hash level is coupled to a data block of the plurality of data blocks, determine a target data block of the plurality of data blocks associated with the data of the read request, read the target data block, read one or more first hashes on a path between a top hash level and the target data block, determine if the one or more first hashes comprises a non-initialized bit, verify the target data block, return, if the one or more first hashes comprises a non-initialized bit or the data block is not verified, a fixed pattern to a sender of the read request, and return, if the one or more first hashes does not comprise a non-initialized bit and the data block is verified, the target data block.

In another embodiment, a data storage device comprises one or more memory devices and a controller coupled to the one or more memory devices. The controller includes means to access a host memory buffer (HMB) of a host device, wherein the HMB comprises a Merkle Tree, means to determine a total number of hash levels of the Merkle Tree, the total number of hash levels being at least two, where each hash level includes at least one hash of a plurality of hashes, and where each hash of a last hash level is coupled to a data block, means to initialize a first number of hash levels, where the first number of hash levels is less than the total number of hash levels, and means to set a non-initialized bit to each hash of a second number of hash levels.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3C are schematic illustrations of a fast initialization of the Merkle Tree, according to certain embodiments.

FIG. 5A is a method illustrating a read flow utilizing a Merkle Tree, according to certain embodiments.

FIG. 5B is a method illustrating a write flow utilizing a Merkle Tree, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices and related methods that use secure host memory buffers (HMBs) and low latency operations. A controller of the data storage device is configured to access the HMB, where the HMB stores a Merkle Tree. When the HMB is initialized, the controller determines a number of hash levels of the Merkle Tree. Each hash level of the Merkle Tree comprises one or more hashes. When storing location data in a target data block of the Merkle Tree, the controller is configured to initialize only the hashes along a path between a top hash and the target data block. Each hash along the path has a non-initialized hash coupled to a common hash. The non-initialized hash is programmed with a non-initialized bit, such that only the relevant hashes and data blocks are initialized.

Figure 1:
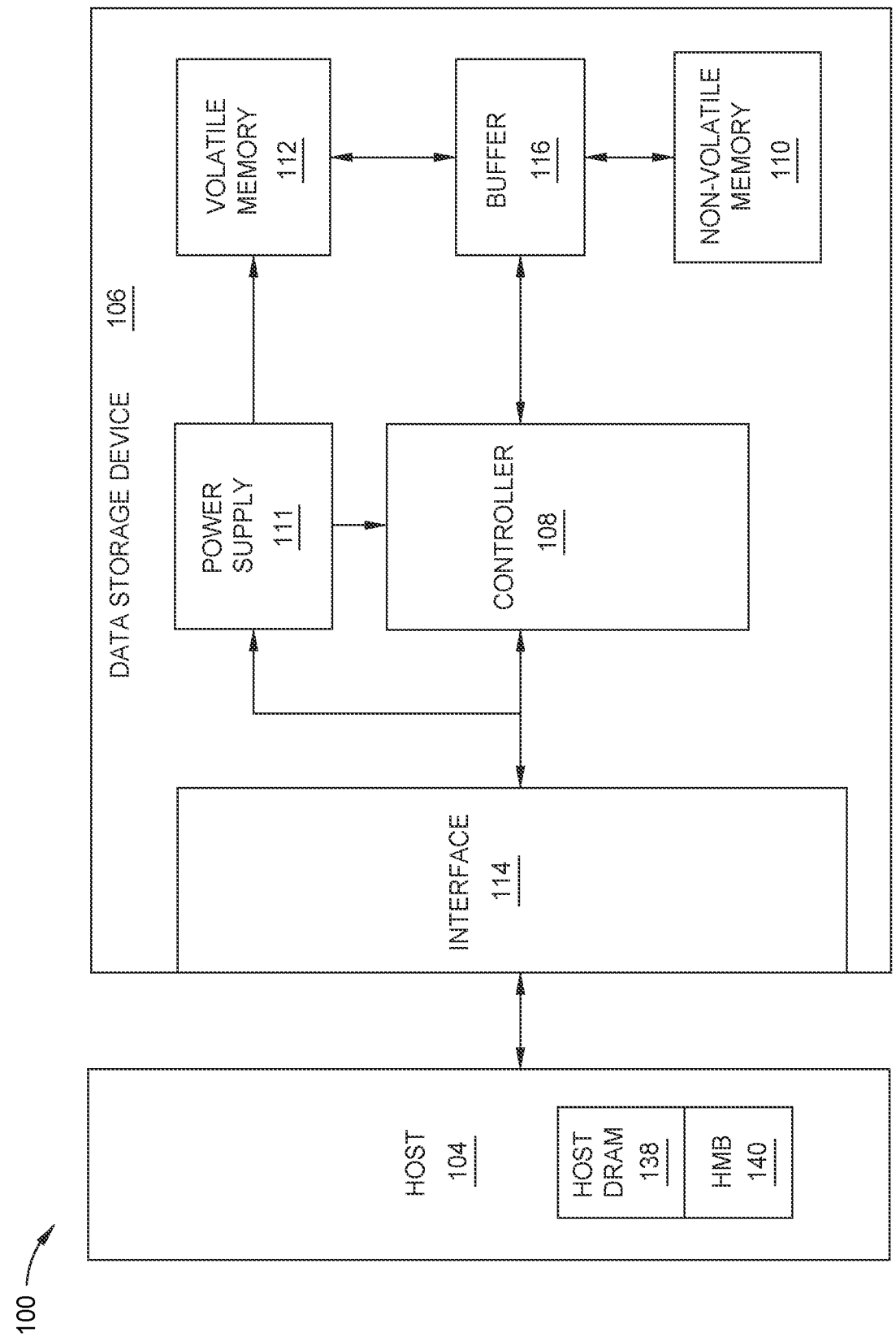
FIG. 1 is a schematic block diagram illustrating a storage system in which data storage device may function as a storage device for a host device, according to certain embodiments.

FIG. 1 is a schematic block diagram illustrating a storage system 100 in which data storage device may function as a storage device for a host device, according to certain embodiments. For instance, the host device 104 may utilize a non-volatile memory (NVM) 110 included in data storage device 106 to store and retrieve data. The host device 104 comprises a host DRAM 138, where a portion of the host DRAM 138 is allocated as a host memory buffer (HMB) 140. The HMB 140 may be used by the data storage device 106 as an additional working area or an additional storage area. The HMB 140 may be inaccessible by the host device 104 in some examples. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110. In some other embodiments, the HMB 140 may be utilized.

Figure 2:
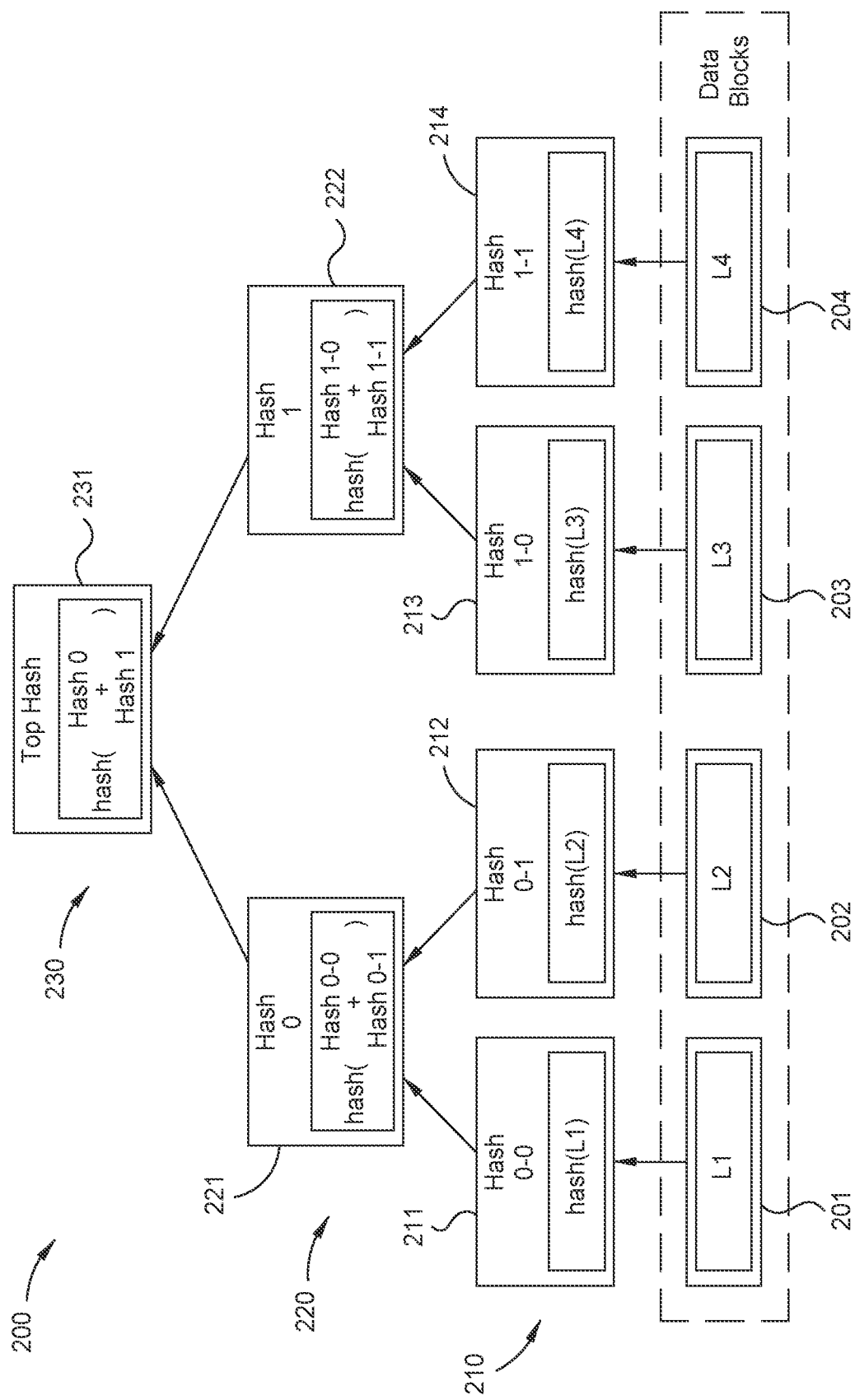
FIG. 2 is a schematic view of a Merkle Tree, according to certain embodiments.

FIG. 2 is a schematic example of a Merkle Tree 200, according to certain embodiments. The Merkle Tree 200 includes data, such as entry data that corresponds to data stored in one or more memory devices. The data is stored in a plurality of data blocks 201-204. The Merkle Tree 200 is part of a host device, such as the HMB 140 of the host device 104 of FIG. 1. The Merkle Tree 200 includes a first plurality of hashes 211-214 of a first hash level 210 and a second plurality of hashes 221, 222 of a second hash level 220. The first plurality of hashes 211-214 are created using the plurality of data blocks 201-204. Each hash of the first plurality of hashes 211-214 corresponds to a data block of the plurality of data blocks 201-204. The second plurality of hashes 221, 222 are created by combining hashes of the first plurality of hashes 211-214.

The Merkle Tree 200 includes a top level hash 231 of a top hash level 230 (i.e., a root of the Merkle Tree 200). The top hash level 230 includes a signature that is created using all of the hashes of the Merkle Tree 200. The signature of the top level hash 231 is created by combining the two hashes 221, 222 of the hash level (e.g., the second hash level 220) that is disposed immediately below the top hash level 230. The signature may include ECC data for the combined hashes. For example, the signature of the top level hash 231 may include ECC data for the two hashes 221, 222 of the second hash level 220. The top hash level 230 includes a single hash (e.g., the top level hash 231). As the Merkle Tree 200 moves upward from the plurality of data blocks 201-204 and toward the top level hash 231, the hashes of each hash level 210, 220 are progressively combined until the signature of the single top level hash 231 is created for the top hash level 230.

The Merkle Tree 200 is used to secure and validate (such as by using a validity check) a portion of a host device. Due to the progressive nature of the hash levels 210, 220, 230, the signature of the top level hash 231 is altered or corrupted if data of even one of the plurality of data blocks 201-204 is altered or corrupted, such as altered or corrupted during a network attack. The altered or corrupted signature of the top level hash 231 indicates that data of one or more of the data blocks 201-204 has been altered or corrupted. When data is written and stored in the data blocks 201-204, the Merkle Tree 200 and the signature of the top level hash 231 are created. The signature of the top level hash 231 is stored as a stored signature or a top level hash 231 signature.

The present disclosure contemplates that FIG. 2 is exemplary and can include more data blocks than the data blocks 201-204 illustrated in FIG. 2, more hash levels than the hash levels 210, 220, 230 illustrated in FIG. 2, and more hashes than the hashes 211-214, 221, 222, 231 shown in FIG. 2.

Figure 3C:
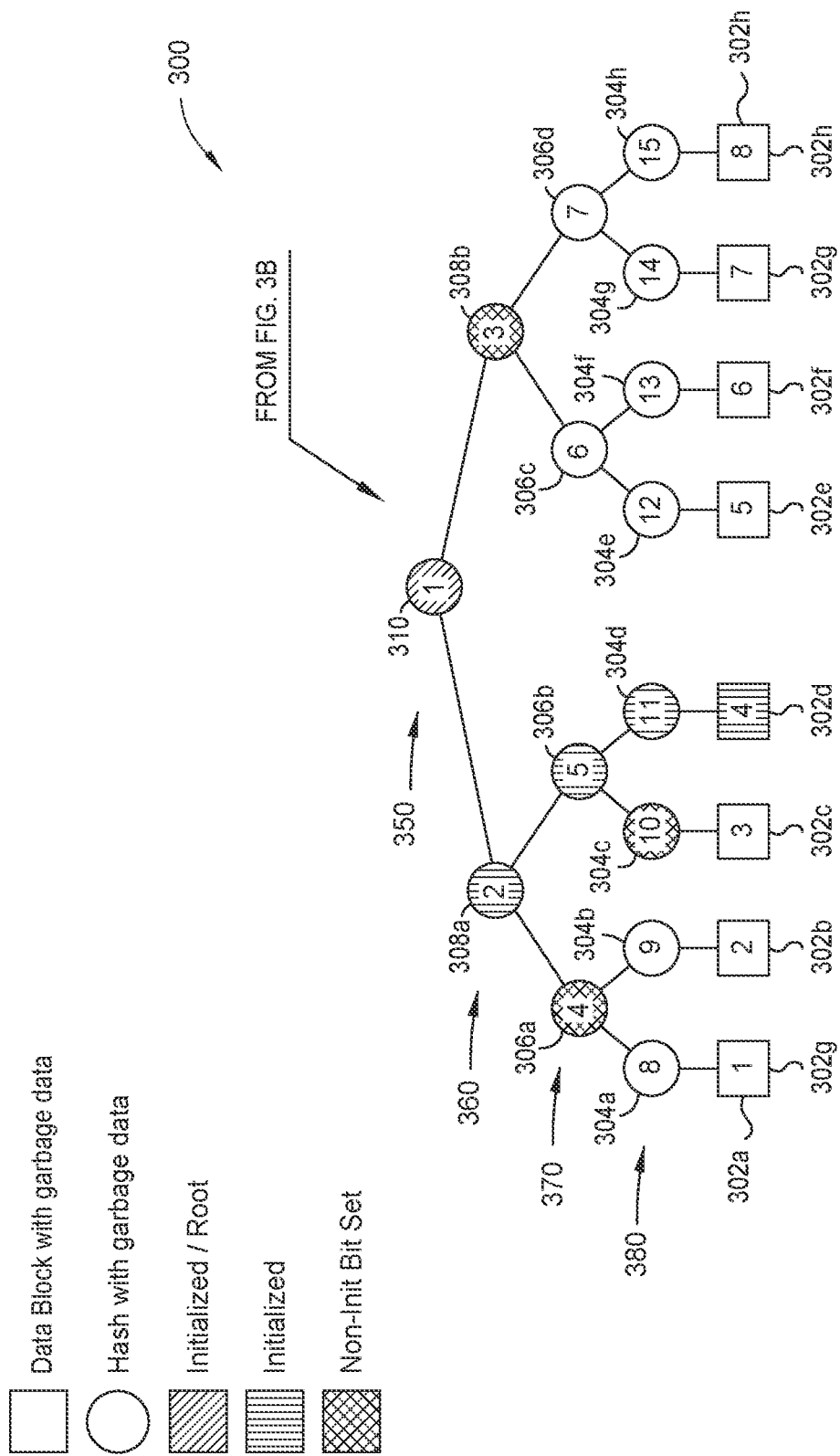

FIGS. 3A-3C are schematic illustrations of a fast initialization of the Merkle Tree 300, according to certain embodiments. The Merkle Tree 300 may be an alternative representation of the Merkle Tree 200 of FIG. 2 that includes additional hash levels, hashes, and data blocks. Referring to FIG. 3A, when the Merkle Tree 300 is allocated, such as when the controller 108 of the storage device 106 first makes a connection to the HMB 140 of the host 104 of FIG. 1, the plurality of hashes 304a-h, 306a-d, 308a-b, 310 and the plurality of data blocks 302a-h are not yet initialized. In some examples, the term "hash" may be referred to as "node" interchangeably, for exemplary purposes.

The plurality of data blocks 302a-h may include one or more entries of a flash translation layer (FTL) table, where the FTL table is a table mapping the location of data stored in the data storage device. The controller 108 may determine a number of hash levels of the Merkle Tree 300. Furthermore, after determining a number of hash levels of the Merkle Tree 300, the controller 108 further determines a number of hash levels to initialize upon allocation or start up. The number of hash levels may depend on the initialization speed required or set by the controller 108. For example, when having a relaxed initialization timing, more hash levels are initialized. However, when having a more strict initialization timing (i.e., quicker initialization time), less hash levels are initialized.

The Merkle Tree 300 comprises a first hash 310 of a top hash level 350 and a number of children hashes (i.e., hashes 2-15 304a-h, 306a-d, 308a-b) in lower hash levels 360, 370, 380. The first hash 310 is coupled to a second hash 308a and a third hash 308b of the second hash level 360. Each hash of the Merkle Tree 300, excluding the hashes of a last hash level (i.e., a bottom hash level 380), are coupled to two other hashes of the lower hash level. For example, the second hash 308a is coupled to a fourth hash 306a and a fifth hash 306b of the third hash level 370. Each hash 304a-h of the bottom hash level 380 is coupled to a data block 302a-302h.

The number of data blocks of the Merkle Tree may depend on the size of each data block, the amount of data, and the structure of the Merkle Tree. Because the Merkle Tree is a binary tree, every two hashes of a lower hash level are coupled to a hash of the level above, as previously described. For example, the amount of data allocated for the Merkle Tree may be about 512 MB, and each data block may store 128 bytes of data. The bottom hash level has 1000 hashes, where each hash is coupled to a data block. In the hash level above the bottom hash level, there are 500 hashes. The number of hashes in the above hash level is half of the number of hashes in the previous hash level. The top hash or the first hash may be considered the root of the Merkle Tree.

Referring to FIG. 3B, after the Merkle Tree 300 has been allocated, the controller 108 determines how many hash levels 350-380 to initialize based on how important the initialization time is. For example, when the initialization time is critical, fewer hash levels are initialized at first, whereas when initialization time is less critical (e.g., when a first write time is more important), more hash levels are initialized. In another example, if fewer hash levels are initialized, then the HMB 140 initialization time is decreased. However, the first write operations to the HMB 140 may be increased based on the number of hash levels initialized. In other words, when determining the number of hash levels to initialize, there is a trade-off between initialization time of the HMB 140 and the speed of the first write operation when the HMB 140 is active. In the present embodiment, the first hash 310 is initialized. In other words, regarding FIG. 3B, the top hash level 350 is initialized.

The initialization of the Merkle Tree 300 may be bottom up. For example, if the top hash level 350 and the second hash level 360 are both initialized, then the second hash level 360 is initialized before the top hash level 350 is initialized. When reading data from the HMB 140, the parsing (i.e., the read) starts from the first hash 310 (i.e., the root) to the target data block. The initialization and the reading may be completed in this order in order to avoid parsing garbage data.

After initializing the top hash level 350, the second hash level 360 hashes 308a-b are programmed with non-initialized bits or flags (referred to as "non-init" bits herein). The non-init bit indicates to the controller 108 that the children (i.e., the hashes coupled to the non-init bit hash in the following hash level) are not initialized. In other word, the non-init bit means that all hashes coupled to the hash including the non-init bit includes garbage data. The logic of the controller 108 assumes fixed patterns for the children hashes (i.e., the signature of each hash depends on the signature of the two hashes in the lower hash level). Upon reading a hash with a non-init bit, such as the second and third hashes 308a-b, the controller 108 determines that each of the remaining hashes in lower hash levels (i.e., the third hash level 370 and the bottom hash level 380) and the data coupled downstream of the second hash 308a and the third hash 308b are non-initialized and includes garbage data. Rather than initializing the entire Merkle Tree 300, only a few hashes are initialized at first, rather than all of the hashes. Thus, the initialization timing may be reduced, resulting in the storage device 106 being ready for command execution faster.

Referring to FIG. 3C, a fourth data block 302d is programmed with data. The data of the fourth data block 302d is associated to data programmed to one or more memory locations of the data storage device. For example, the one or more memory locations may be one or more blocks of the NVM 110 of FIG. 1. In order to program data to the fourth data block 302d, one or more first hashes on a path between the first hash 310 and the fourth data block 302d are initialized. Furthermore, non-init bits may be removed from any hashes on the path between first or top hash 310 and the target data block, which is the fourth data block 302d in this example. For example, the non-init bit of the second hash 308a is removed to initialize the second hash 308a. The second hash 308a, the fifth hash 306b, and the eleventh hash 304d are initialized to set the path to the fourth data block 302d from the first hash 310. Thus, the path between the first hash 310 and the fourth data block 302d includes the second hash 308a, the fifth hash 306b, and an eleventh hash 304d. The eleventh hash 304d is coupled to the fourth data block 302d. The one or more second hashes not on the data path, such as a fourth hash 306a and a tenth hash 304c, are programmed with the non-init bit. As more data blocks are programmed, more hashes are initialized building upon the previously initialized hashes.

The first hash 310 includes a top hash signature that is calculated based on the signatures of the connected hashes. For example, the eleventh hash 304d may include a first signature, where the first signature may be ECC parity data for the fourth data block 302d. The fifth hash 306b signature is calculated using the signature of the non-init bit stored in the tenth hash 304c and the eleventh hash 304d. Likewise, the second hash 308a signature is calculated utilizing the signature of the non-init bit stored in the fourth hash 306a and the calculated signature of the fifth hash 306b. The signature of the first hash 310 is calculated using the calculated signature of the second hash 308a and the signature of the third hash 308b. After calculating the signature of the first hash 310, data verification may occur to ensure that the signature of the first hash 310 matches the fourth data block 302d or any other relevant initialized data block.

Figure 4:
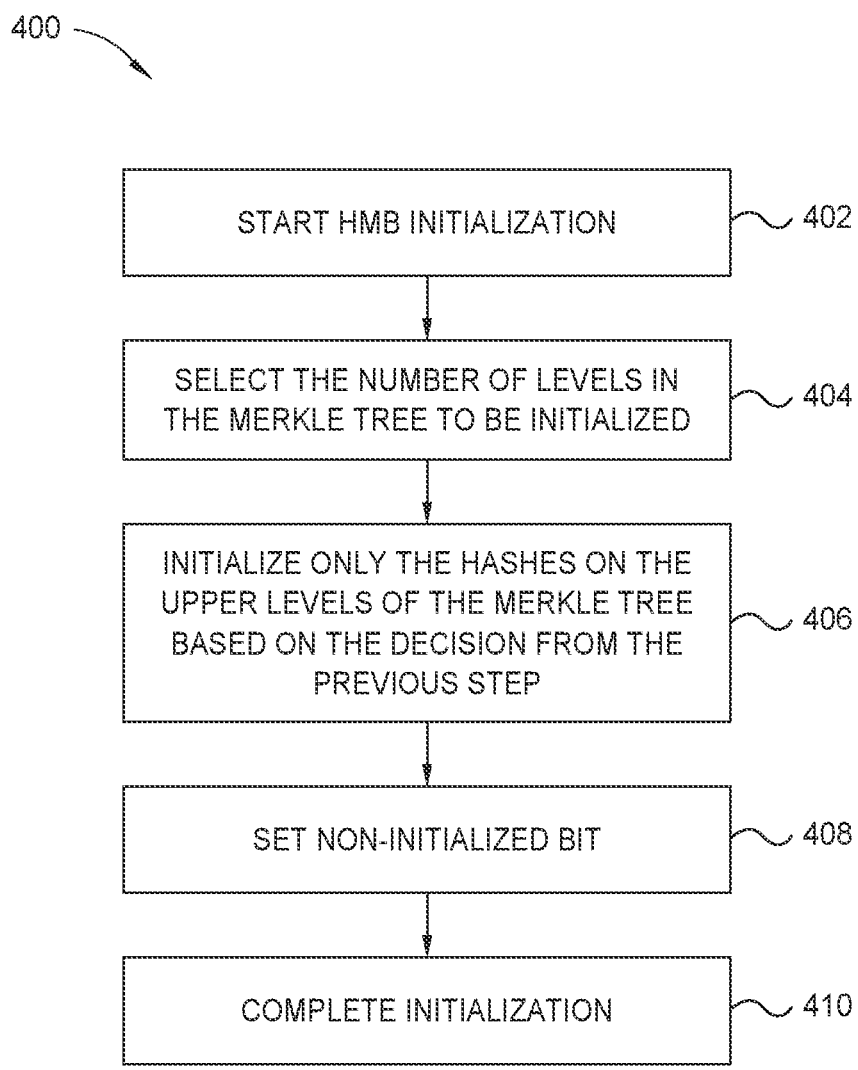
FIG. 4 is a method illustrating a fast initialization of the HMB, according to certain embodiments.

FIG. 4 is a method 400 illustrating a fast initialization of the HMB, according to various embodiments. The method 400 may be utilized with the storage system 100 of FIG. 1. As such, aspects of FIG. 1 may be referred to with the method 400.

At block 402, the HMB initialization is started. The HMB initialization may be when the data storage device 106 is connected to a host device 104, or when the data storage device 106 is powered on or started up. When the controller 108 accesses the HMB 140, the controller 108 may set parameters for the Merkle Tree, such as the Merkle Tree 200 of FIG. 2 or the Merkle Tree 300 of FIGS. 3A-3C, according to a desired initialization speed. One parameter may include a number of hash levels to be initialized. For example, a lower number of hash levels corresponds to a faster initialization speed and a higher number of hash levels corresponds to a lower initialization speed. When the Merkle Tree is initiated, the plurality of hashes and the plurality of data blocks are not yet initiated.

At block 404, the controller 108 selects a number of hash levels of the Merkle Tree to be initialized. For example, referring to the Merkle Tree 200 of FIG. 2, the controller 108 may determine that the hashes 211-214, 221-222, 231 of the top hash level 230, the second hash level 220, and the first hash level 210 are to be initialized. In another example, rather than initializing all of the hashes 211-214, 221-222, 231 of the Merkle Tree 200, only the top hash 231 is to be initialized.

At block 406, the controller 108 is configured to initialize the relevant one or more first hashes on the upper levels of the Merkle Tree based on the decision determined at block 404. For example, referring to FIG. 3B, when the controller 108 determines to initialize only a single hash level, only the first hash 310 of the top hash level 350 is initialized. In another example, when the controller 108 determines to initialize the first two hash levels, the hashes of the top hash level 350 and the second hash level 360 are initialized, as described in FIG. 3B. At block 408, the controller 108 sets or programs the non-initialized bit to the one or more second hashes of the Merkle Tree. Referring to FIG. 3B, when the top hash level 350 and the second hash level 360 are initialized, the fourth hash 306a, the fifth hash 306b, the sixth hash 306c, and the seventh hash 308d are each programmed with a non-init bit, indicating that the fourth hash 306a, the fifth hash 306b, the sixth hash 306c, and the seventh hash 308d, and the hashes in the lower hash levels (i.e., the hashes 304a-304h of the bottom hash level 380) are non-initialized. At block 410, the HMB initialization process is completed.

FIG. 5A is a method 500 illustrating a read flow utilizing a Merkle Tree, according to certain embodiments. The method 500 may be utilized with the storage system 100 of FIG. 1. As such, aspects of FIG. 1 may be referred to with the method 500. The method 500 may be used with the method 400. For example, upon executing the method 400, the method 500 may be used.

At block 502, the controller 108 receives a read request for data in the one or more memory devices 110 of the data storage device 106, where the location of the data is stored in data block x. In the current example, data block x may be the fourth data block 302d of FIGS. 3A-3C. At block 504, the fourth data block 302 is read from the HMB 140. At block 506, the relevant hashes are read from the Merkle Tree 300. The relevant hashes are the one or more first hashes that are initialized and the one or more second hashes that have a non-init bit programmed or set to the hash. When reading the one or more first hashes and the one or more second hashes, the signature of the hashes is calculated, such that the first hash 310 signature is calculating utilizing the hashes of the lower hash levels.

At block 508, the controller 108 determines if there are any non-init bits programmed to any of the one or more first hashes. If there are no non-init bits, method 500 proceeds directly to block 512. If there is a non-init bit programmed to one or more of the one or more first hashes, then at block 510, the controller assumes a fixed pattern for the target data block (i.e., the fourth data block 302d), and then proceeds to block 512. When the controller 108 assumes a fixed pattern, the controller 108 determines that the hashes and the data blocks that are related to the hash with the non-init bit are non-initialized and includes garbage data. At block 512, the target data block is verified with the signature of the first hash 310. If the verification passes, then the data of the target data block is retrieved from the HMB 140. However, if the verification fails, then the controller 108 is notified that the data is either corrupted, wrong, or non-existent, such that the data stored in the target data block of the HMB 140 is garbage data.

FIG. 5B is a method 550 illustrating a write flow utilizing a Merkle Tree, according to certain embodiments. The method 550 may be utilized with the storage system 100 of FIG. 1. As such, aspects of FIG. 1 may be referred to with the method 550. The method 550 may be used with the method 400 and/or the method 500. For example, upon executing the method 400, the method 550 may be used.

At block 552, the controller 108 receives a write request for data block x. The write request may correspond to the location of the data being programmed to the one or more memory devices 110 of the data storage device 106. In the current example, data block x may be the fourth data block 302d of FIGS. 3A-3C. At block 554, the controller 108 reads the fourth data block 302d and the one or more first hashes of the Merkle Tree 300 and verifies that the one or more first hashes has not yet been modified. The one or more first hashes may be the hashes initialized on a path between the top hash 310 and the fourth data block 302d.

At block 556, the controller 108 determines if there are any non-init bits on the path. If there are any non-init bits on the path at block 556, the controller 108, at block 558, moves the non-init bits to the one or more second hashes not on the path, and then proceeds to block 560. If there are no non-init bits on the path at block 556, method 550 moves directly to from block 556 to block 560. At block 560, the controller 108 programs data to the fourth data block 302d and updates the signatures of the one or more first hashes that are initialized.

By choosing the number of hashes of a Merkle Tree of the HMB to initialize, relevant properties, such as initialization time or write time, may be dynamically selected. Initializing a minimal number of hashes and data blocks of the Merkle Tree during HMB initialization results in a secure HMB while decreasing initialization time and improving data storage device latency. Initializing a greater number of hashes and data blocks of the Merkle Tree at initialization results in a secure HMB while decreasing a write time of the data storage device. As such, the data storage device may balance the needs of the user and/or host when determining the number of hashes to initialize at HMB initialization to achieve the needs of the user and/or host.

In one embodiment, a data storage device comprises one or more memory devices and a controller coupled to the one or more memory devices. The controller is configured to access a host memory buffer (HMB) of a host device, where the HMB includes a Merkle Tree comprising a plurality of data blocks and a total number of hash levels, where each hash level of the Merkle Tree includes at least one hash of a plurality of hashes, and where each hash of a last hash level is coupled to a data block of the plurality of data blocks, determine a first number of hash levels of the Merkle Tree to initialize, the first number of hash levels being less than the total number of hash levels, initialize the first number of hash levels, and initialize one or more first hashes on a path between a top hash level and a target data block of the plurality of data blocks.

The initializing the one or more first hashes on the path includes programming a signature to each of the one or more first hashes. The Merkle Tree is a binary hash tree. The number of hash levels is at least two hash levels. A first hash level has a first number of hashes and a second hash level has a second number of hashes. The second number of hashes is equal to two times the first number of hashes. A first hash of the first number of hashes is coupled to a second hash and a third hash of the second number of hashes. A signature of the first hash is calculated based on the second hash and the third hash. The initializing the one or more first hashes includes programming a non-initialized bit to a non-initialized hash off the path. The controller is further configured to remove the non-initialized bit from the non-initialized hash when the non-initialized hash is initialized.

In another embodiment, a data storage device comprises one or more memory devices and a controller coupled to the one or more memory devices. The controller is configured to receive a access a HMB of a host device, where the HMB comprises a Merkle Tree comprising a plurality of data blocks and a number of hash levels, where each hash level of the Merkle Tree comprises at least one hash of a plurality of hashes, and where each hash of a last hash level is coupled to a data block of the plurality of data blocks, determine a target data block of the plurality of data blocks associated with the data of the read request, read the target data block, read one or more first hashes on a path between a top hash level and the target data block, determine if the one or more first hashes comprises a non-initialized bit, verify the target data block, return, if the one or more first hashes comprises a non-initialized bit or the data block is not verified, a fixed pattern to a sender of the read request, and return, if the one or more first hashes does not comprise a non-initialized bit and the data block is verified, the target data block.

Each hash of the last hash level is coupled to a data block of the plurality of data blocks. The plurality of data blocks comprises a plurality of entries of a flash translation layer (FTL) table. The target data block comprises one or more entries corresponding to a location of the data of a read request stored in the one or more memory devices. The controller is further configured to determine if any of the one or more first hashes comprises a non-initialized bit, where at least one of the one or more first hashes including the non-initialized bit returns the fixed pattern, and where none of the one or more first hashes include the non-initialized bit returns the target data block. The returning the fixed pattern includes sending an indication. The indication indicates that the target data block includes garbage data.

A first hash level of the number of hash levels has a first number of hashes and a second hash level of the number of hash levels disposed adjacent to the first hash level has a second number of hashes. The second number of hashes is equal to two times the first number of hashes. The reading includes reading a first hash of the second hash level, the first hash being coupled to the data block, fetching a second hash of the second hash level, where the first hash and the second hash are coupled to a third hash of the first hash level, and calculating a third signature of the third hash based on a first signature of the first hash and a second signature of the second hash. The reading further includes comparing a calculated top hash signature to the target data block and returning data of the target data block when the calculated top hash signature matches the target data block.

In another embodiment, a data storage device comprises one or more memory devices and a controller coupled to the one or more memory devices. The controller includes means to access a host memory buffer (HMB) of a host device, wherein the HMB comprises a Merkle Tree, means to determine a total number of hash levels of the Merkle Tree, the total number of hash levels being at least two, where each hash level includes at least one hash of a plurality of hashes, and where each hash of a last hash level is coupled to a data block, means to initialize a first number of hash levels, where the first number of hash levels is less than the total number of hash levels, and means to set a non-initialized bit to each hash of a second number of hash levels.

The controller further includes means to determine a path between a top hash and a target data block, where one or more first hashes on the path are initialized, and where one or more second hashes off the path are set with the non-initialized bit, means to determine if the one or more second hashes include the non-initialized bit, and means to remove the non-initialized bit upon initializing a hash of the one or more second hashes or a hash of the second number of hash levels. The controller further includes means to calculate a calculated top hash signature. The means to calculate a calculated top hash signature includes calculating a signature of the one or more first hashes. The controller further includes means to send a verification upon determining that a target data block matches a calculated top hash signature. The total number of hash levels is variable based on a determined initialization speed.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more memory devices; and
a controller coupled to the one or more memory devices, the controller configured to:
access a host memory buffer (HMB) of a host device, wherein the HMB comprises a Merkle Tree comprising a plurality of data blocks and a total number of hash levels, wherein each hash level of the Merkle Tree comprises at least one hash of a plurality of hashes, and wherein each hash of a last hash level is coupled to a data block of the plurality of data blocks;

determine a first number of hash levels of the Merkle Tree to initialize, the first number of hash levels being less than the total number of hash levels;

initialize the first number of hash levels;

initialize one or more first hashes on a path between a top hash level and a target data block of the plurality of data blocks, wherein initializing the one or more first hashes comprises programming a non-initialized bit to a non-initialized hash off the path; and remove the non-initialized bit from the non-initialized hash when the non-initialized hash is initialized.

2. The data storage device of claim 1, wherein initializing the one or more first hashes on the path comprises programming a signature to each of the one or more first hashes.

3. The data storage device of claim 1, wherein the Merkle Tree is a binary hash tree, and wherein the total number of hash levels is at least two hash levels.

4. The data storage device of claim 3, wherein a first hash level has a first number of hashes and a second hash level has a second number of hashes, and wherein the second number of hashes is equal to two times the first number of hashes.

5. The data storage device of claim 4, wherein a first hash of the first number of hashes is coupled to a second hash and a third hash of the second number of hashes.

6. The data storage device of claim 5, wherein a signature of the first hash is calculated based on the second hash and the third hash.

7. A data storage device, comprising:

one or more memory devices; and a controller coupled to the one or more memory devices, the controller configured to:

determine a target data block of a plurality of data blocks of a Merkle Tree of a host memory buffer (HMB) associated with the data of a read request, the Merkle Tree further comprising a number of hash levels, wherein each hash level comprises at least one hash of a plurality of hashes, and wherein a last hash level is coupled to the plurality of data blocks;

read the target data block and one or more first hashes on a path between a top hash level and the target data block;

determine if any of the one or more first hashes comprises a non-initialized bit, wherein at least one of the one or more first hashes comprising the non-initialized bit returns a fixed pattern, and wherein none of the one or more first hashes comprise the non-initialized bit returns the target data block; and return either the fixed pattern or the target data block.

8. The data storage device of claim 7, wherein:

each hash of the last hash level is coupled to a data block of the plurality of data blocks;

the plurality of data blocks comprises a plurality of entries of a flash translation layer (FTL) table; and the target data block comprises one or more entries corresponding to a location of the data of a read request stored in the one or more memory devices.

9. The data storage device of claim 7, wherein returning the fixed pattern comprises sending an indication, and wherein the indication indicates that the target data block comprises garbage data.

10. The data storage device of claim 7, wherein a first hash level of the number of hash levels has a first number of hashes and a second hash level of the number of hash levels disposed adjacent to the first hash level has a second number of hashes, and wherein the second number of hashes is equal to two times the first number of hashes.

11. The data storage device of claim 10, wherein the reading comprises:

reading a first hash of the second hash level, the first hash being coupled to the data block;

fetching a second hash of the second hash level, wherein the first hash and the second hash are coupled to a third hash of the first hash level; and calculating a third signature of the third hash based on a first signature of the first hash and a second signature of the second hash.

12. The data storage device of claim 11, wherein the reading further comprises:

comparing a calculated top hash signature to the target data block; and returning data of the target data block when the calculated top hash signature matches the target data block.

13. A data storage device, comprising:

one or more memory devices;

a controller coupled to the one or more memory devices, the controller comprising:

means to access a host memory buffer (HMB) of a host device, wherein the HMB comprises a Merkle Tree;

means to determine a total number of hash levels of the Merkle Tree, the total number of hash levels being at least two, wherein each hash level comprises at least one hash of a plurality of hashes, and wherein each hash of a last hash level is coupled to a data block;

means to initialize a first number of hash levels, wherein the first number of hash levels is less than the total number of hash levels; and means to set a non-initialized bit to each hash of a second number of hash levels.

14. The data storage device of claim 13, wherein the controller further comprises:

means to determine a path between a top hash and a target data block, wherein one or more first hashes on the path are initialized, and wherein one or more second hashes off the path are set with the non-initialized bit;

means to determine if the one or more second hashes comprise the non-initialized bit; and means to remove the non-initialized bit upon initializing a hash of the one or more second hashes or a hash of the second number of hash levels.

15. The data storage device of claim 13, wherein the controller further comprises means to calculate a calculated top hash signature, wherein the means to calculate the calculated top hash signature comprises calculating a signature of the one or more first hashes.

16. The data storage device of claim 15, wherein the controller further comprises means to send a verification upon determining that a target data block matches the calculated top hash signature.

17. The data storage device of claim 13, wherein the total number of hash levels is variable based on a determined initialization speed.

* * * * *